United States Patent
Kojima et al.

(10) Patent No.: US 8,429,810 B2
(45) Date of Patent: Apr. 30, 2013

(54) METHOD OF MANUFACTURING ROTOR FOR DYNAMOELECTRIC MACHINE

(75) Inventors: Ryotaro Kojima, Anjo (JP); Yuji Sugiyama, Anjo (JP); Keigo Moriguchi, Takahama (JP); Koji Kondo, Kiyosu (JP)

(73) Assignee: Denso Corporation, Kariya (JP)

( * ) Notice: Subject to any disclaimer, the term of this patent is extended or adjusted under 35 U.S.C. 154(b) by 363 days.

(21) Appl. No.: 12/585,543

(22) Filed: Sep. 17, 2009

(65) Prior Publication Data

US 2010/0071196 A1 Mar. 25, 2010

(30) Foreign Application Priority Data

Sep. 19, 2008 (JP) .................. 2008-241048

(51) Int. Cl.
*H02K 15/02* (2006.01)
*H02K 15/10* (2006.01)

(52) U.S. Cl.
USPC ............. 29/598; 29/596; 29/607; 29/889.7

(58) Field of Classification Search ........... 29/598, 29/596, 604, 607, 889.7; 219/50, 78.01, 219/85.15, 93; 310/51, 62–64
See application file for complete search history.

(56) References Cited

U.S. PATENT DOCUMENTS

| | | | |
|---|---|---|---|
| 5,241,230 A * | 8/1993 | Tanaka et al. | 310/62 |
| 6,011,235 A | 1/2000 | Mukai et al. | |
| 7,893,381 B2 * | 2/2011 | Fujita et al. | 219/78.01 |

| | | | |
|---|---|---|---|
| 2003/0222054 A1 | 12/2003 | Katou et al. | |
| 2007/0001524 A1 | 1/2007 | Ishida | |
| 2007/0040458 A1 | 2/2007 | Fujita et al. | |

FOREIGN PATENT DOCUMENTS

| | | |
|---|---|---|
| JP | A-10-85947 | 4/1998 |
| JP | A-2004-227954 | 8/2004 |
| WO | WO 2005/072902 A1 | 8/2005 |

OTHER PUBLICATIONS

Office Action issued in Japanese Patent Application No. 2008-241048 dispatched on Sep. 14, 2010. (with English-Language translation).

Aug. 17, 2012 Extended European Search Report issued in European Patent Application No. 09011938.9.

* cited by examiner

*Primary Examiner* — Thiem Phan
(74) *Attorney, Agent, or Firm* — Oliff & Berridge, PLC

(57) ABSTRACT

There is disclosed a method of manufacturing a rotor for a dynamoelectric machine. The rotor includes a rotating shaft, a rotor core fixed on the rotating shaft, and a cooling fan fixed to an axial end face of the rotor core. The method includes the step of fixing the cooling fan to the axial end face of the rotor core by resistance welding. The method is characterized in that in the resistance welding, both a positive electrode and a negative electrode are first brought into contact with the cooling fan to have the cooling fan held between the axial end face of the rotor core and both the positive and negative electrodes, and then weld current is supplied to flow from the positive electrode to the negative electrode.

2 Claims, 6 Drawing Sheets

WELD SPOT (PROJECTION 12c)

METHOD OF MANUFACTURING ROTOR FOR DYNAMOELECTRIC MACHINE

CROSS-REFERENCE TO RELATED APPLICATION

This application is based on and claims priority from Japanese Patent Application No. 2008-241048, filed on Sep. 19, 2008, the content of which is hereby incorporated by reference in its entirety into this application.

BACKGROUND OF THE INVENTION

1. Technical Field of the Invention

The present invention relates generally to methods of manufacturing rotors for dynamoelectric machines, such as electric motors and electric generators. More particularly, the invention relates to an improved method of fixing a cooling fan to an axial end face of a rotor core by resistance welding.

2. Description of the Related Art

International Publication No. WO 2005/072902, an English equivalent of which is U.S. Patent Application Publication No. 2007/0040458, discloses a method of fixing a cooling fan to an axial end face of a rotor core by resistance welding. Both the cooling fan and the rotor core are included in, for example, a rotor of an automotive alternator.

More specifically, as shown in FIG. 8B, the rotor core is made up of a pair of Lundell-type pole cores 100 each of which includes a plurality of claw poles extending in the axial direction of the rotor. The claw poles of one of the pole cores 100 are alternately arranged with those of the other pole core 100 in the circumferential direction of the rotor. The rotor further includes a plurality of permanent magnets 110, each of which is interposed between a circumferentially-adjacent pair of the claw poles of the pole cores 100.

The resistance welding is performed as follows. First, a cooling fan 120 is disposed on an axial end face of one of the pole cores 100 (i.e., the upper one of the pole cores 100 in FIG. 8B). Then, as shown in FIGS. 8A and 8B, a plurality of positive electrodes 130 are brought into contact with a surface of the cooling fan 120 from the opposite side to the pole core 100, whereas a plurality of negative electrodes 140 are brought into contact with a surface of the pole core 100. Thereafter, weld current is supplied to flow between each electrode pair consisting of one of the positive electrodes 130 and one of the negative electrodes 140. In addition, the cooling fan 120 has a plurality of projections formed on a surface of the cooling fan 120 to be joined to the axial end face of the pole core 100. During the resistance welding, the projections are melted by the heat generated by the resistance to the weld current between each electrode pair, thereby forming welds between the surface of the cooling fan 120 and the axial end face of the pole core 100.

However, in the above resistance welding, each electrode pair is used to form only one weld between the cooling fan 120 and the pole core 100. Therefore, it is necessary to supply a large amount of weld current to the electrode pairs in proportion to the number of the weld spots (i.e., the number of the projections). Accordingly, it is necessary to employ a large-capacity power source for the resistance welding.

Further, in the rotor, each of the permanent magnets is so magnetized as to reduce leakage magnetic flux between the circumferentially-adjacent pair of the claw poles of the pole cores 100. However, when a large amount of the weld current flows through the pole core 100 which is to be joined to the cooling fan 120, the permanent magnets may be undesirably magnetized by a magnetic field created by the weld current. As a result, the permanent magnets may become unable to accomplish the function of reducing the leakage magnetic flux.

SUMMARY OF THE INVENTION

According to the present invention, there is provided a method of manufacturing a rotor for a dynamoelectric machine. The rotor includes a rotating shaft, a rotor core fixed on the rotating shaft, and a cooling fan fixed to an axial end face of the rotor core. The method includes the step of fixing the cooling fan to the axial end face of the rotor core by resistance welding. The method is characterized in that in the resistance welding, both a positive electrode and a negative electrode are first brought into contact with the cooling fan to have the cooling fan held between the axial end face of the rotor core and both the positive and negative electrodes, and then weld current is supplied to flow from the positive electrode to the negative electrode.

With the above method, it is possible to form two welds between the cooling fan and the rotor core at the same time using only the pair of the positive and negative electrodes. Consequently, it is possible to reduce the total amount of the weld current necessary for fixing the cooling fan to the rotor core in comparison with the case of using the conventional method disclosed in International Publication No. WO 2005/072902. As a result, it is possible to employ a small-capacity power source for the resistance welding.

According to a further implementation of the invention, the cooling fan includes a pair of projections each of which makes up a weld spot between the cooling fan and the axial end face of the rotor core. The resistance welding is projection welding in which the positive and negative electrodes are respectively aligned with the projections of the cooling fan in the axial direction of the rotating shaft to concentrate the weld current on the projections.

By performing the above projection welding, it is possible to form high-quality welds between the cooling fan and the axial end face of the rotor core.

The rotor core is made up of a pair of Lundell-type pole cores each of which includes a plurality of claw poles extending in the axial direction of the rotating shaft. The claw poles of one of the pole cores are alternately arranged with those of the other pole core in the circumferential direction of the rotating shaft. The rotor further includes a plurality of permanent magnets each of which is interposed between a circumferentially-adjacent pair of the claw poles of the pole cores to reduce leakage magnetic flux between the pair of the claw poles.

With the method according to the invention, it is possible to reduce the total amount of the weld current flowing through the rotor core during the resistance welding in comparison with the case of using the conventional method. Consequently, it is possible to more reliably prevent the permanent magnets from being undesirably magnetized by the weld current.

In one preferred embodiment of the invention, the cooling fan is composed of a pair of first and second cooling fan pieces which are disposed on the same plane perpendicular to the axial direction of the rotating shaft and separated from each other by an air gap extending in the radial direction of the rotating shaft. In the resistance welding, the positive and negative electrodes are respectively brought into contact with the first and second cooling fan pieces.

With the air gap formed between the first and second cooling fan pieces, it is possible to block the weld current from flowing directly between the two cooling fan pieces. Consequently, it is possible to ensure a sufficient amount of the weld current which sequentially passes the positive electrode, the first cooling fan piece, the rotor core, the second cooling fan piece, and the negative electrode. As a result, it is possible to form two high-quality welds between the rotor core and the first and second cooling fan pieces.

In another preferred embodiment of the invention, the cooling fan includes first and second portions which are adjacent to each other with a cut formed therebetween. In the resistance welding, the positive and negative electrodes are respectively brought into contact with the first and second portions of the cooling fan.

With the cut formed between the first and second portions of the cooling fan, it is possible to limit the weld current from flowing directly between the two portions. Consequently, it is possible to ensure a sufficient amount of the weld current which sequentially passes the positive electrode, the first portion of the cooling fan, the rotor core, the second portion of the cooling fan, and the negative electrode. As a result, it is possible to form two high-quality welds between the rotor core and the first and second portions of the cooling fan.

In yet another preferred embodiment of the invention, the cooling fan is composed of a pair of first and second cooling fan pieces each of which includes a plurality of blade portions and an annular connecting portion that connects the blade portions. The blade portions of the first cooling fan piece are alternately arranged with those of the second cooling fan piece in the circumferential direction of the rotating shaft, and the annular connecting portion of the first cooling fan piece is overlapped with that of the second cooling fan piece in the axial direction of the rotating shaft. The annular connecting portions of the first and second cooling fan pieces are electrically insulated from each other. In the resistance welding, the positive and negative electrodes are respectively brought into contact with the first and second cooling fan pieces.

With the electrical insulation provided between the annular connecting portions of the first and second cooling fan pieces, it is possible to block the weld current from flowing directly between the two cooling fan pieces. Consequently, it is possible to ensure a sufficient amount of the weld current which sequentially passes the positive electrode, the first cooling fan piece, the rotor core, the second cooling fan piece, and the negative electrode. As a result, it is possible to form two high-quality welds between the rotor core and the first and second cooling fan pieces.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings:

FIGS. 8A and 8B are diagrams together illustrating a conventional welding method, wherein FIG. 8A is a schematic plan view of a cooling fan, and FIG. 8B is a schematic cross-sectional view of a rotor of an automotive alternator with electrodes for resistance welding attached thereto.

DESCRIPTION OF PREFERRED EMBODIMENTS

Figure 1:
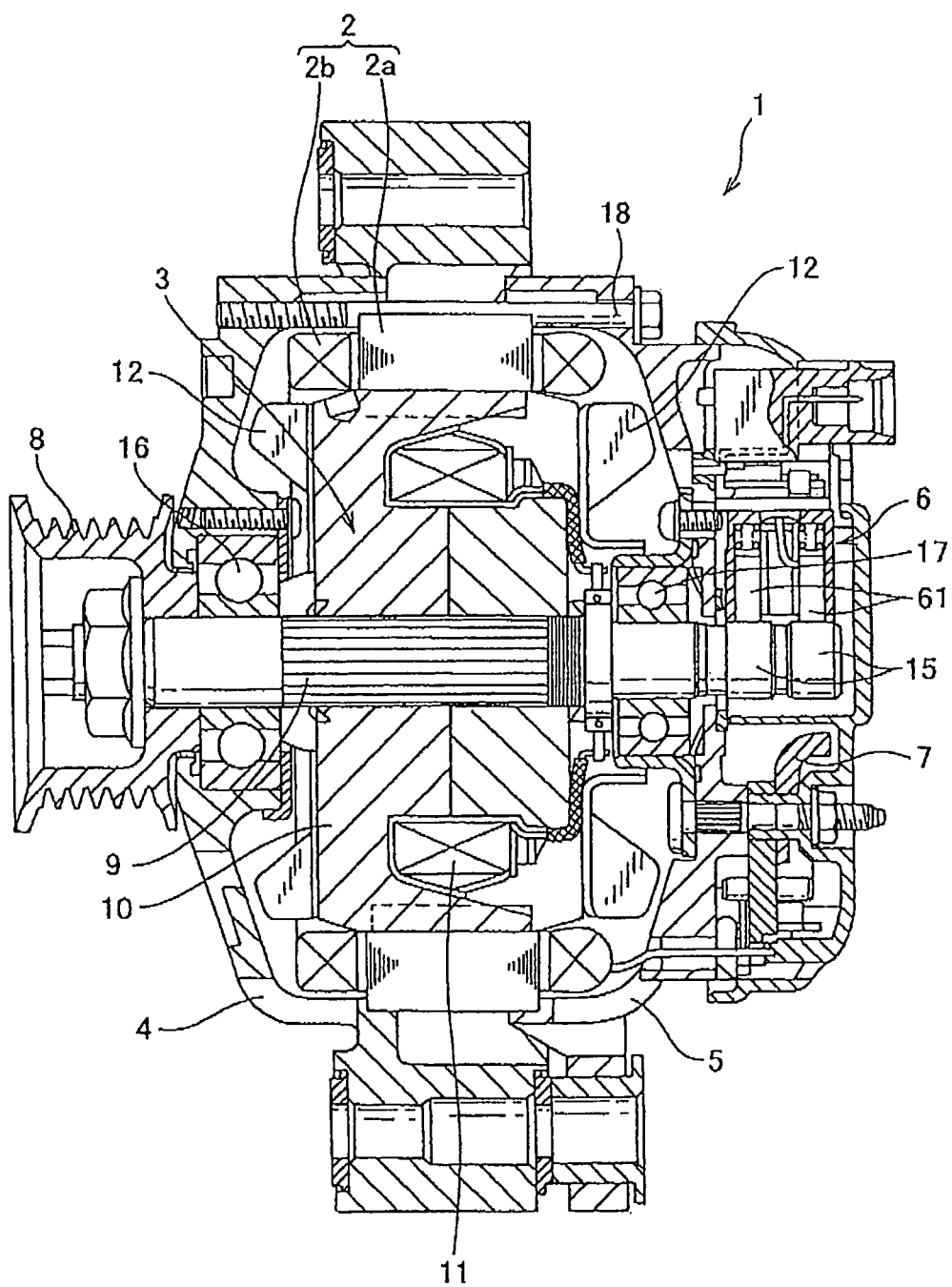
FIG. 1 is a schematic cross-sectional view of an automotive alternator according to the first embodiment of the invention.

Preferred embodiments of the present invention will be described hereinafter with reference to FIGS. 1-7B. It should be noted that, for the sake of clarity and understanding, identical components having identical functions in different embodiments of the invention have been marked, where possible, with the same reference numerals in each of the figures.

First Embodiment

FIG. 1 shows the overall configuration of an automotive alternator 1 which includes a rotor 3 manufactured by a method according to the first embodiment of the invention. The alternator 1 is designed to be used in a motor vehicle, such as a passenger car or a truck.

As shown in FIG. 1, the alternator 1 includes a stator 2, the rotor 3, a pair of housings 4 and 5, a brush assembly 6, and a rectifier 7.

The stator 2 includes a hollow cylindrical stator core 2a and a three-phase stator coil 2b wound around the stator core 2a. The stator 2 generates three-phase AC power in a rotating magnetic field created by the rotor 3.

The rotor 3 includes a rotating shaft 9, a rotor core made up of a pair of Lundell-type pole cores 10 fixed on the rotating shaft 9, a field coil 11 wound around the pole cores 10, a pair of cooling fans 12 respectively fixed to axial end faces of the pole cores 10, and a plurality of permanent magnets 13 interposed between the pole cores 10. In addition, a pulley 8 is mounted on an end portion of the rotating shaft 9, so that torque generated by an engine of the vehicle can be transmitted to the rotor 3 via the pulley 8, thereby driving the rotor 3. The rotor 3 creates the rotating magnetic field during rotation thereof.

Figure 2A:
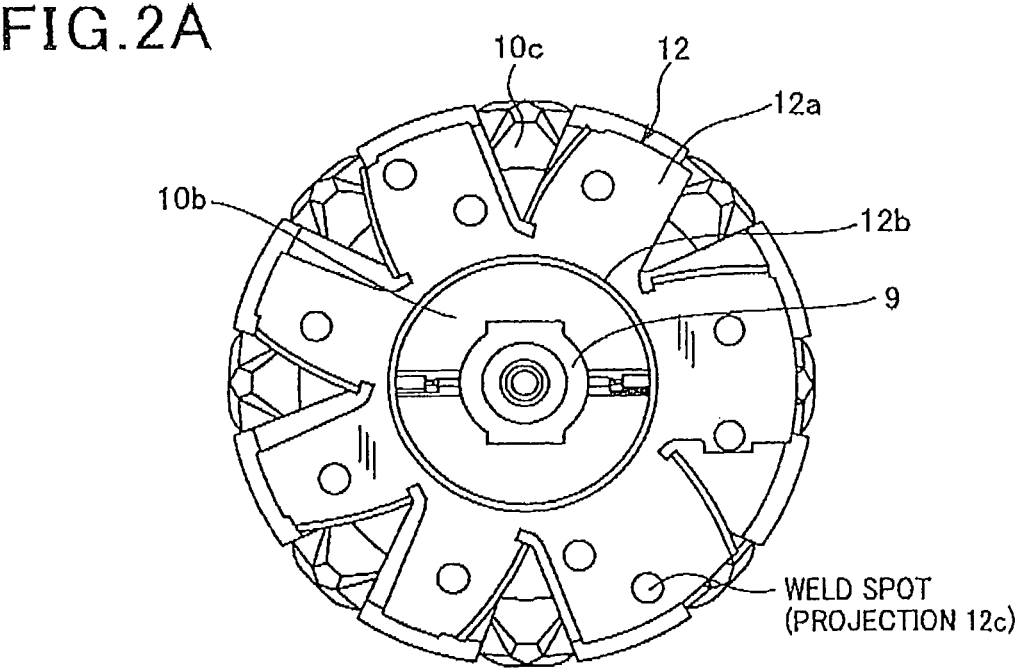
FIG. 2A is a schematic end view of a rotor of the alternator.
Figure 2B:
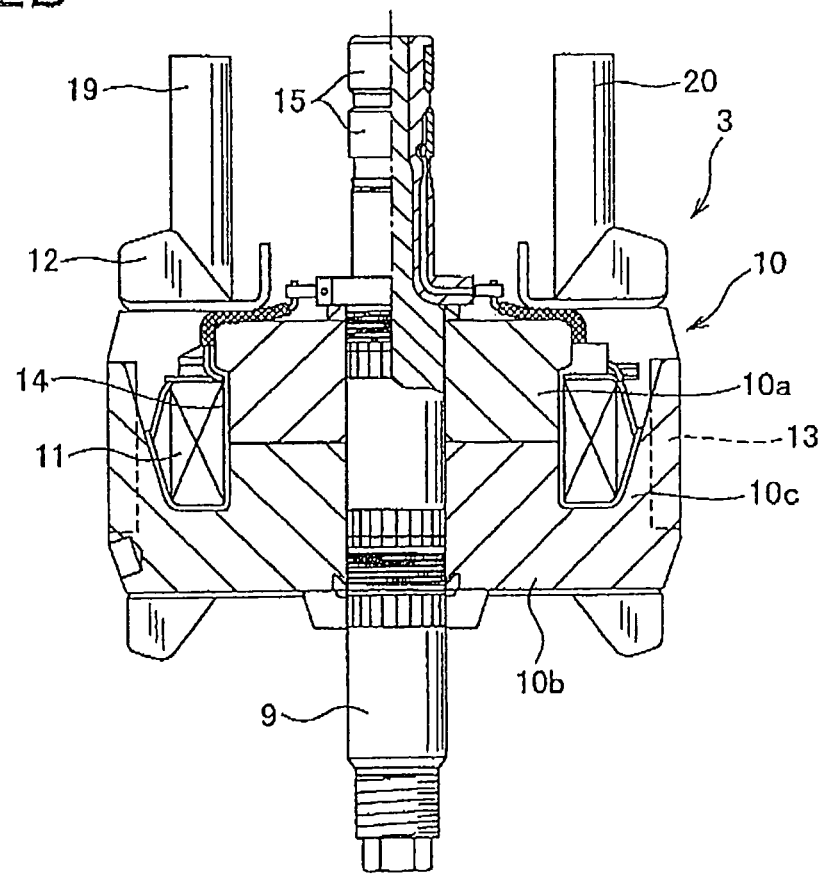
FIG. 2B is a schematic cross-sectional view of the rotor with electrodes for resistance welding attached thereto.

Each of the pole cores 10 includes, as shown in FIG. 2B, a hollow cylindrical boss portion 10a, a disc portion 10b, and a plurality of claw poles 10c. The boss portion 10a is press-fitted on the rotating shaft 9. The disc portion 10b extends radially outward from an axially outer part of the boss portion 10a. Each of the claw poles 10c axially extends from a radially outer part of the disc portion 10b toward the other one of the pole cores 10.

The pole cores 10 are so assembled together that: the inside axial end face of the boss portion 10a of one of the pole cores 10 abuts that of the boss portion 10a of the other pole core 10; and the claw poles 10c of one of the pole cores 10 are interleaved with those of the other pole core 10. Consequently, the claw poles 10c of one of the pole cores 10 are alternately arranged with those of the other pole 10 in the circumferential direction of the rotating shaft 9.

The field coil 11 is wound around the radially outer surfaces of the boss portions 10a of the pole cores 10 via a resin-made bobbin 14. The field coil 11 has an opposite pair of ends that are respectively electrically connected to a pair of slip rings 15; the slip rings 15 are provided on an end portion of the rotating shaft 9 on the opposite side to the pulley 8.

When field current is supplied to the field coil 11 via the slip rings 15, the claw poles 10c of one of the pole cores 10 are each magnetized to form a north pole, whereas the claw poles 10c of the other pole core 10 are each magnetized to form a south pole. The rotating magnetic field is created with rotation of the north and south poles formed by the claw poles 10c of the pole cores 10.

The cooling fans 12 are respectively fixed to the axial end faces of the pole cores 10 (more specifically, the outside axial end faces of the disc portions 10b) to create a cooling air flow during rotation of the rotor 3. As shown in FIG. 2A, each of the cooling fans 12 includes a plurality of (e.g., seven) blade portions 12a, which are equally spaced in the circumferential direction of the rotating shaft 9, and an annular connecting portion 12b that is located radially inside of the blade portions 12a to connect all of the blade portions 12a together.

Each of the permanent magnets 13 is interposed between a circumferentially-adjacent pair of the claw poles 10c of the pole cores 10. Further, each of the permanent magnets 13 is so magnetized as to reduce leakage magnetic flux between the circumferentially-adjacent pair of the claw poles 10c.

The housings 4 and 5 together support and accommodate therein both the stator 2 and the rotor 3. More specifically, as shown in FIG. 1, the housings 4 and 5 are connected, by means of a plurality of bolts 18, to each other with the stator core 2a of the stator 2 sandwiched therebetween. Further, the housings 4 and 5 together rotatably support the rotating shaft 9 via a pair of bearings 16 and 17 that are respectively provided in the housings 4 and 5.

The brush assembly 6 is provided to supply the field current to the field coil 11 during rotation of the rotor 3. The brush assembly 6 includes a pair of brushes 61 that are respectively spring-loaded on the slip rings 15 to establish sliding contacts with them during rotation of the rotor 3.

The rectifier 7 is configured to full-wave rectify the three-phase AC power output from the three-phase stator coil 2b of the stator 2 into DC power. In addition, part of the DC power is used as the field current to energize the field coil 11 of the rotor 3.

After having described the overall configuration of the alternator 1, the method of manufacturing the rotor 3 according to the present embodiment will be described hereinafter.

First, all of the components of the rotor 3 are prepared which include the rotating shaft 9, the pair of pole cores 10, the field coil 11, the pair of cooling fans 12, and the plurality of permanent magnets 13. Then, all of the components of the rotor 3 other than the cooling fans 12 are assembled together in any manner well known in the art. Thereafter, the cooling fans 12 are respectively joined, by resistance welding, to the axial end faces of the pole cores 10. As a result, the rotor 3 is finally obtained.

Moreover, the method of manufacturing the rotor 3 is characterized by an improved method of performing resistance welding to join the cooling fans 12 respectively to the axial end faces of the pole cores 10.

It should be noted that the cooling fans 12 are joined to the corresponding pole cores 10 by the same method; therefore, for the sake of simplicity, only the process of joining one of the cooling fans 12 to the axial end face of the corresponding pole core 10 will be described hereinbelow.

As illustrated in FIG. 2A, in the present embodiment, the cooling fan 12 has a plurality of (e.g., ten) projections 12c, each of which is formed on a surface of one of the blade portions 12a of the cooling fan 12. Further, on the surface of each of the blade portions 12a, at least one of the projections 12c is formed.

Each of the projections 12c makes up a weld spot between the cooling fan 12 and the axial end face of the pole core 10. That is to say, the resistance welding performed in the present embodiment is projection welding.

In performing the projection welding, referring to FIG. 2B, the cooling fan 12 is first placed on the pole core 10, so that each of the projections 12c of the cooling fan 12 abuts the axial end face of the pole core 10.

Figure 3:
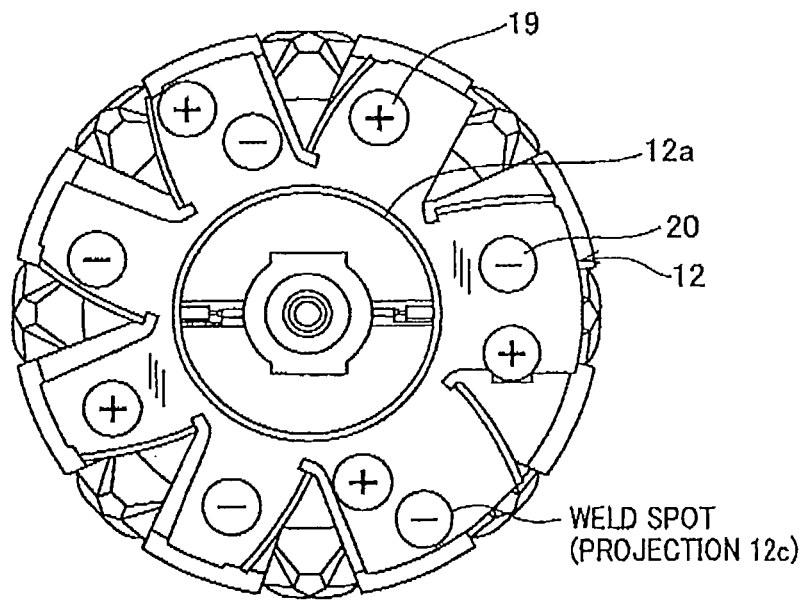
FIG. 3 is a schematic end view of the rotor illustrating the arrangement of a plurality of electrodes for resistance welding according to the first embodiment.

Then, a plurality of pairs (e.g., five pairs) of positive electrodes 19 and negative electrodes 20 are placed on the cooling fan 12, so that each of the positive and negative electrodes 19 and 20 is brought into contact with a surface of one of the blade portions 12a on the opposite side to the pole core 10. The number of the positive and negative electrodes 19 and 20 is the same as the number of the projections 12c of the cooling fan 12. Further, as shown in FIG. 3, each of the positive and negative electrodes 19 and 20 is aligned with a corresponding one of the projections 12c of the cooling fan 12 in the axial direction of the rotating shaft 9. The positive electrodes 19 are alternately arranged with the negative electrodes 20 in the circumferential direction of the rotating shaft 9.

Thereafter, weld current is supplied from a power source (not shown) to flow between each electrode pair consisting of one of the positive electrodes 19 and one of the negative electrodes 20 while pressing each electrode pair against the cooling fan 12. Consequently, the weld current is concentrated on each of the projections 12c of the cooling fan 12. More specifically, for each electrode pair, the weld current sequentially passes the positive electrode 19, the projection 12c of the cooling fan 12 axially aligned with the positive electrode 19, the pole core 10, the projection 12c of the cooling fan 12 axially aligned with the negative electrode 20, and the negative electrode 20. As a result, for each of the projections 12c of the cooling fan 12, the contacting portions of the projection 12c and the pole core 10 are melted and mixed together, thereby forming a weld between the cooling fan 12 and the axial end face of the pole core 10.

The above-described method of manufacturing the rotor 3 has the following advantages.

In the present embodiment, for each electrode pair consisting of one of the positive electrodes 19 and one of the negative electrodes 20, both the positive and negative electrodes 19 and 20 are first brought into contact with the cooling fan 12, from the opposite side to the pole core 10, to have the cooling fan 12 held between the axial end face of the pole core 10 and both the positive and negative electrodes 19 and 20; then, the weld current is supplied to flow from the positive electrode 19 to the negative electrode 20.

With the above welding method, it is possible to form two welds between the cooling fan 12 and the axial end face of the pole core 10 at the same time using only one electrode pair.

In comparison, in the case of using the conventional welding method disclosed in International Publication No. WO 2005/072902, to form two welds at the same time, it is necessary to employ two electrode pairs that are electrically connected to a power source in parallel with each other.

Therefore, with the welding method according to the present embodiment, it is possible to reduce the total amount of the weld current necessary for fixing the cooling fan 12 to the pole core 10 in comparison with the case of using the conventional welding method. As a result, it is possible to reduce the necessary capacity of the power source. In other words, it is possible to employ a small-capacity power source for the resistance welding.

Further, with the welding method according to the present embodiment, it is possible to reduce the total amount of the weld current flowing through the pole core 10 during the resistance welding in comparison with the case of using the conventional welding method. Consequently, it is possible to more reliably prevent the permanent magnets 13 from being undesirably magnetized by the weld current.

Figure 4:
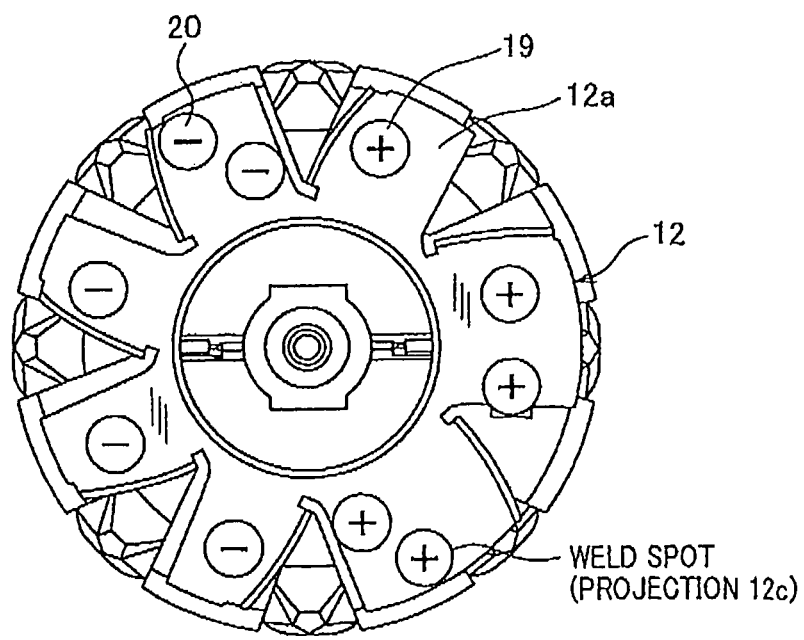
FIG. 4 is a schematic end view of the rotor illustrating a modification of the arrangement of the electrodes.

In addition, in the present embodiment, the positive electrodes 19 are alternately arranged with the negative electrodes 20 in the circumferential direction of the rotating shaft 9. However, the positive and negative electrodes 19 and 20 may also be arranged in any other manner. For example, as shown in FIG. 4, the positive and negative electrodes 19 and 20 may be arranged so that all of the positive electrodes 19 are adjacent to each other without the negative electrodes 20 interposed therebetween in the circumferential direction of the rotating shaft 9. Moreover, in the present embodiment, all of the ten projections 12c are simultaneously welded to the pole core 10 by using the five electrode pairs. However, it is also possible to use only one electrode pair to weld all of the ten projections 12c in five stages, in each of which two of the projections 12c are simultaneously welded to the pole core 10.

Second Embodiment

Figure 5:
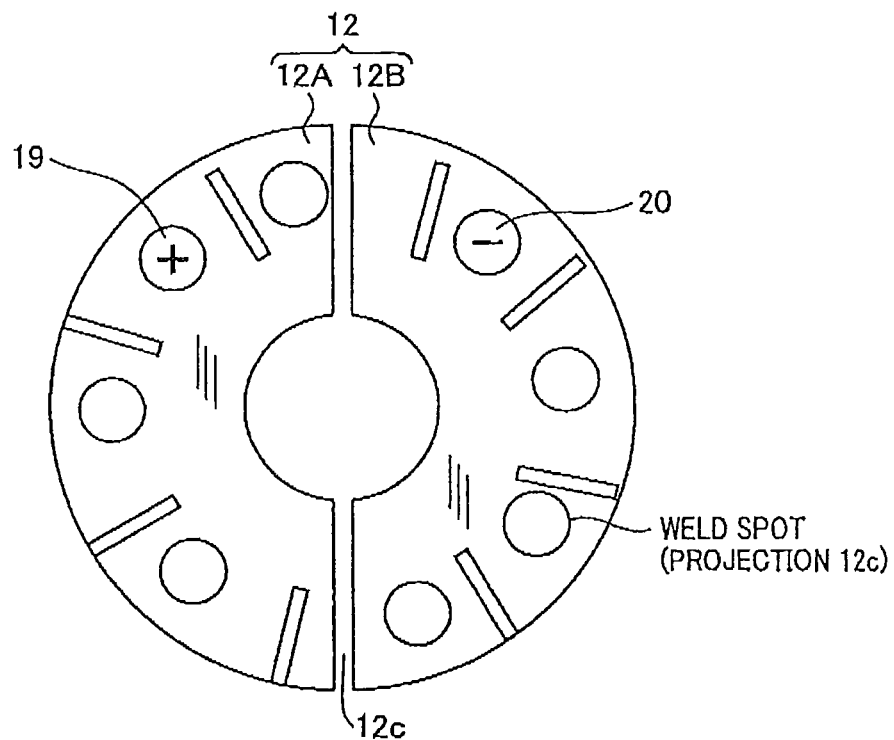
FIG. 5 is a schematic plan view of a cooling fan according to the second embodiment of the invention.

FIG. 5 shows a cooling fan 12 according to the second embodiment of the invention.

As shown in FIG. 5, in the present embodiment, the cooling fan 12 is composed of a pair of cooling fan pieces 12A and 12B which are disposed on the same plane perpendicular to the axial direction of the rotating shaft 9 and each occupy one half of the entire angular range (i.e., 360°) of the cooling fan 12. Further, the cooling fan pieces 12A and 12B are separated from each other by an air gap 12C that extends in the radial direction of the rotating shaft 9.

In welding the cooling fan 12 to the corresponding pole core 10, for each electrode pair consisting of one of the positive electrodes 19 and one of the negative electrodes 20, the positive electrode 19 and the negative electrode 20 are respectively brought into contact with the cooling fan pieces 12A and 12C from the opposite side to the pole core 10; then, the weld current is supplied to flow from the positive electrode 19 to the negative electrode 20.

In the present embodiment, with the air gap formed between the cooling fan pieces 12A and 12B, it is possible to block the weld current from flowing from the cooling fan piece 12A directly to the cooling fan piece 12B. Consequently, for each electrode pair, it is possible to ensure a sufficient amount of the weld current which sequentially passes the positive electrode 19, the projection 12c of the cooling fan piece 12A axially aligned with the positive electrode 19, the pole core 10, the projection 12c of the cooling fan piece 12B axially aligned with the negative electrode 20, and the negative electrode 20. As a result, each of the projections 12c of the cooling fan pieces 12A and 12B can be supplied with the sufficient amount of the weld current, thereby preventing formation of a poor weld due to insufficient weld current.

In addition, as described above, the cooling fan 12 is composed of the pair of cooling fan pieces 12A and 12B in the present embodiment. However, the cooling fan 12 may also be composed of more than two cooling fan pieces which are separated from each other by radial air gaps formed therebetween and each of which only contacts with electrodes having the same polarity.

Third Embodiment

Figure 6:
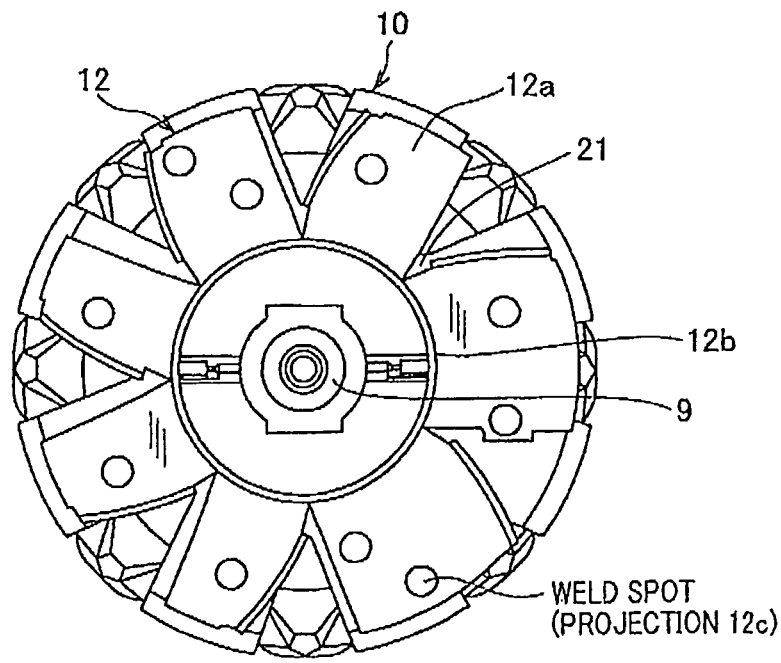
FIG. 6 is a schematic end view of a rotor according to the third embodiment of the invention.

FIG. 6 shows a cooling fan 12 according to the third embodiment of the invention.

As shown in FIG. 6, in the present embodiment, the cooling fan 12 has a plurality of cuts (or slits) 21 each of which is formed between a circumferentially-adjacent pair of the blade portions 12a of the cooling fan 12. Further, each of the cuts 21 is so deeply formed in the radial direction of the rotating shaft 9 as to reach the annular connecting portion 12b. As a result, the blade portions 12a of the cooling fan 12 are connected to each other only by the annular connecting portion 12b.

In comparison, in the case of the cooling fan 12 according to the first embodiment (shown in FIG. 2A), the blade portions 12a are connected to each other not only by the annular connecting portion 12b but also by root parts of the blade portions 12a which are integrally formed without cuts 21 formed therebetween.

In the present embodiment, in welding the cooling fan 12 to the corresponding pole core 10, for each electrode pair consisting of one of the positive electrodes 19 and one of the negative electrodes 20, the positive and negative electrodes 19 and 20 are respectively brought into contact with two different ones of the blade portions 12a of the cooling fan 12; then, the weld current is supplied to flow from the positive electrode 19 to the negative electrode 20.

With the cuts 21 formed between the blade portions 12a of the cooling fan 12, it is possible to limit the weld current from flowing directly between the blade portions 12a. Consequently, for each electrode pair, it is possible to ensure a sufficient amount of the weld current which sequentially passes the positive electrode 19, the projection 12c of the cooling fan 12 axially aligned with the positive electrode 19, the pole core 10, the projection 12c of the cooling fan 12 axially aligned with the negative electrode 20, and the negative electrode 20. As a result, each of the projections 12c of the cooling core 12 can be supplied with the sufficient amount of the weld current, thereby preventing formation of a poor weld due to insufficient weld current.

In addition, in the present embodiment, the blade portions 12a of the cooling fan 12 are still connected to each other by the annular connecting portion 12b. Therefore, the cooling 12 can still be easily handled as a one-piece component of the rotor 3.

Fourth Embodiment

Figure 7A:
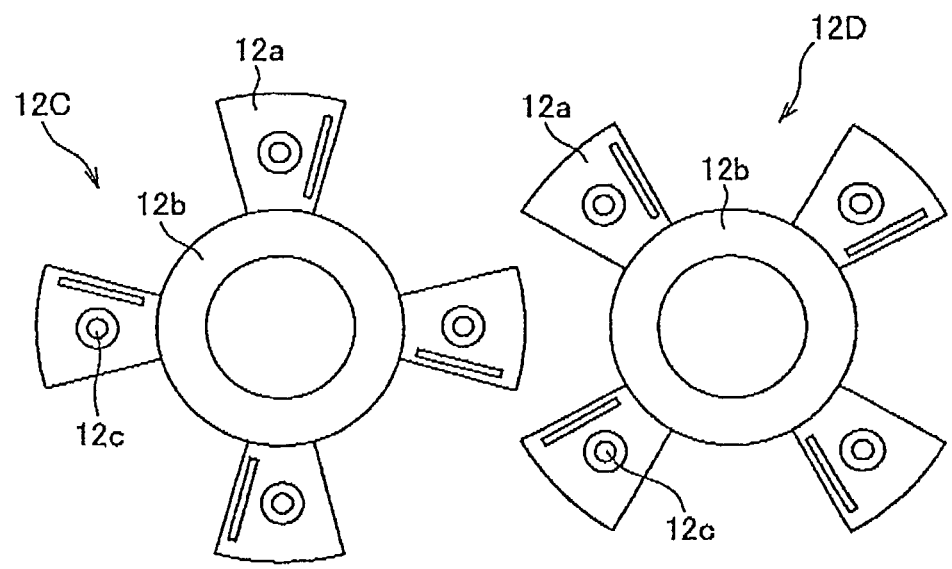
FIG. 7A is a schematic plan view showing a pair of cooling fan pieces according to the fourth embodiment of the invention.
Figure 7B:
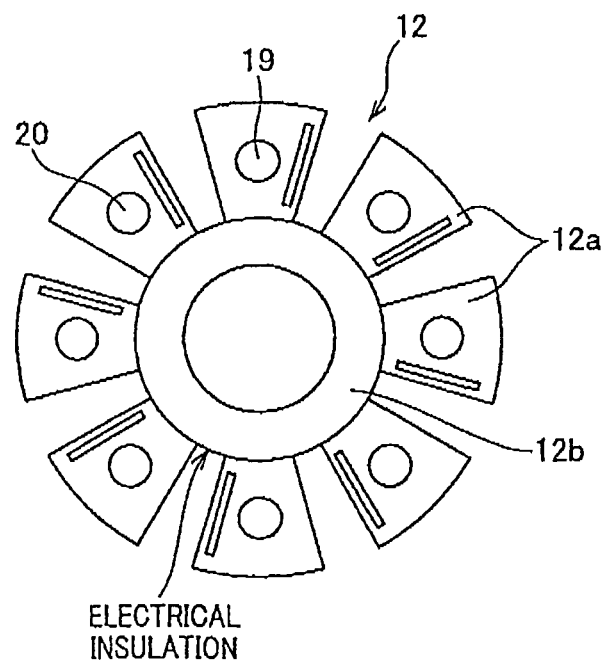
FIG. 7B is a schematic plan view of a cooling fan which is obtained by assembling the cooling fan pieces of FIG. 7A together.
Figure 8A:
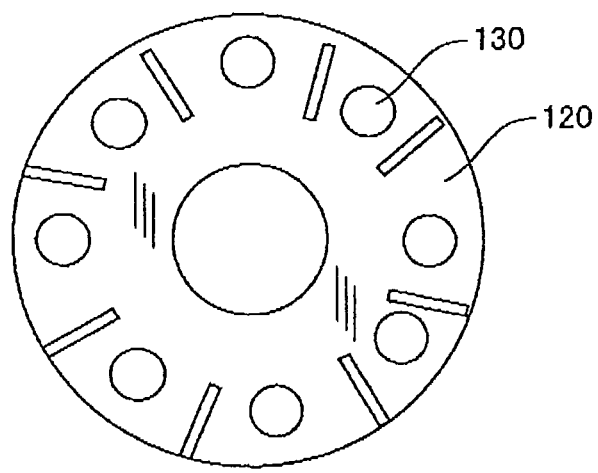
Figure 8B:
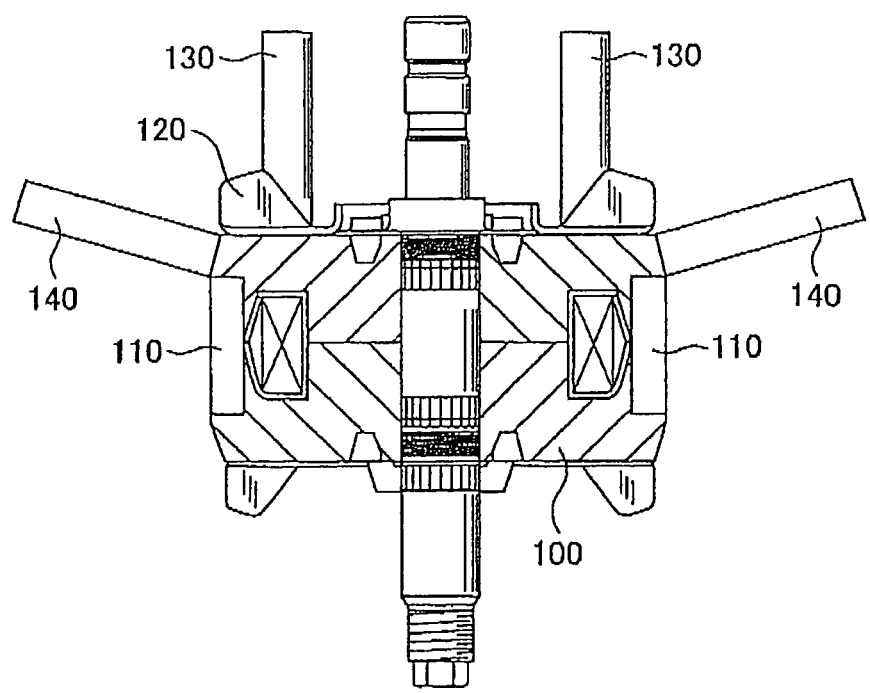

FIG. 7A shows a pair of cooling fan pieces 12C and 12D according to the fourth embodiment of the invention. FIG. 7B shows a cooling fan 12 which is obtained by assembling the cooling fan pieces 12C and 12D together.

As shown in FIG. 7A, each of the cooling fan pieces 12C and 12D includes a plurality of (e.g., four) blade portions 12a, which are equally spaced in the circumferential direction, and an annular connecting portion 12b that is located radially inside of the blade portions 12a to connect all of the blade portions 12a together.

Moreover, as shown in FIG. 7B, the cooling fan pieces 12C and 12D are assembled together so that: the blade portions 12a of the cooling fan piece 12C are alternately arranged with those of the cooling fan piece 12D in the circumferential direction of the rotating shaft 9; and the annular connecting portion 12b of the cooling fan piece 12C is overlapped with that of the cooling fan piece 12D in the axial direction of the rotating shaft 9. Furthermore, the annular connecting portions 12b of the cooling fan pieces 12C and 12D are electrically insulated from each other.

In welding the cooling fan 12 to the corresponding pole core 10, for each electrode pair consisting of one of the positive electrodes 19 and one of the negative electrodes 20, the positive electrode 19 and the negative electrode 20 are respectively brought into contact with the cooling fan pieces 12C and 12D from the opposite side to the pole core 10; then, the weld current is supplied to flow from the positive electrode 19 to the negative electrode 20.

In the present embodiment, with the electrical insulation provided between the annular connecting portions 12b of the cooling fan pieces 12C and 12D, it is possible to block the weld current from flowing from the cooling fan piece 12C directly to the cooling fan piece 12D. Consequently, for each electrode pair, it is possible to ensure a sufficient amount of the weld current which sequentially passes the positive electrode 19, the projection 12c of the cooling fan piece 12C axially aligned with the positive electrode 19, the pole core 10, the projection 12c of the cooling fan piece 12D axially aligned with the negative electrode 20, and the negative electrode 20. As a result, each of the projections 12c of the cooling fan pieces 12C and 12D can be supplied with the sufficient amount of the weld current, thereby preventing formation of a poor weld due to insufficient weld current.

While the above particular embodiments and modifications have been shown and described, it will be understood by those skilled in the art that various further modifications, changes, and improvements may be made without departing from the spirit of the invention.

For example, in the first embodiment, all of the components of the rotor 3 other than the cooling fans 12 are first assembled together, and then the cooling fans 12 are respectively welded to the axial end faces of the pole cores 10. However, it is also possible to first weld the cooling fans 12 respectively to the axial end faces of the pole cores 10 and then assemble all of the components of the rotor 3 together.

What is claimed is:

1. A method of manufacturing a rotor for a dynamoelectric machine, the rotor including a rotor core supported by a rotating shaft and at least one cooling fan fixed to an axial end face of the rotor core, the method comprising a step of resistance-welding the cooling fan to the axial end face of the rotor core, wherein the cooling fan includes a plurality of fan blades and a ring portion located radially inside of the fan blades so as to connect the fan blades together;

a slit is formed between two circumferentially-adjacent fan blades of the cooling fan so that the two fan blades are connected only by the ring portion of the cooling fan; and in the resistance-welding step, a positive welding electrode and a negative welding electrode are respectively brought into contact with the two fan blades so that the cooling fan is held between the axial end face of the rotor core and both the positive and negative welding electrodes, and then weld current is supplied so as to flow from the positive welding electrode to the negative welding electrode, wherein the cooling fan further includes a pair of projections respectively provided in the two fan blades of the cooling fan so as to form two weld spots between the cooling fan and the axial end face of the rotor core, and in the resistance welding step, the positive and negative welding electrodes are respectively aligned with the two projections of the cooling fan in an axial direction of the rotating shaft and pressed against the cooling fan, thereby concentrating the weld current on the two projections.

2. The method as set forth in claim 1, wherein the rotor core is made up of a pair of Lundell-type pole cores each of which includes a plurality of claw-shaped magnetic poles formed on an outer periphery thereof, the pole cores are opposed in an axial direction so that the claw-shaped magnetic poles of one of the pole cores mesh with those of the other pole core, and between each circumferentially-adjacent pair of the claw-shaped magnetic poles of the pole cores, there is interposed a permanent magnet that is magnetized in a direction to reduce leakage magnetic flux between the pair of the claw-shaped magnetic poles.

* * * * *